United States Patent
Yamauchi

(10) Patent No.: US 10,379,729 B2
(45) Date of Patent: Aug. 13, 2019

(54) INFORMATION PROCESSING APPARATUS, INFORMATION PROCESSING METHOD AND A NON-TRANSITORY STORAGE MEDIUM

(71) Applicant: CANON KABUSHIKI KAISHA, Tokyo (JP)

(72) Inventor: Kazunori Yamauchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 416 days.

(21) Appl. No.: 15/067,070

(22) Filed: Mar. 10, 2016

(65) Prior Publication Data

US 2016/0196032 A1    Jul. 7, 2016

Related U.S. Application Data

(62) Division of application No. 14/024,939, filed on Sep. 12, 2013, now abandoned.

(30) Foreign Application Priority Data

Sep. 14, 2012    (JP) .................................. 2012-203095

(51) Int. Cl.
  *G06F 3/0488*    (2013.01)
  *G06F 3/041*    (2006.01)
(52) U.S. Cl.
  CPC .......... *G06F 3/0488* (2013.01); *G06F 3/0418* (2013.01); *G06F 3/04883* (2013.01)

(58) Field of Classification Search
  CPC ... G06F 3/0488; G06F 3/0418; G06F 3/04883
  See application file for complete search history.

(56) References Cited

U.S. PATENT DOCUMENTS 9,158,455 B2 * 10/2015 Bhatt .................. G06F 3/04845
9,230,076 B2 *  1/2016 King ........................ G06F 21/53
9,325,752 B2 *  4/2016 Vasudevan ............ H04L 65/403
(Continued)

FOREIGN PATENT DOCUMENTS

JP    2006-343856 A    12/2006
JP    2007-207281 A     8/2007
(Continued)

*Primary Examiner* — Benyam Ketema
(74) *Attorney, Agent, or Firm* — Cannon USA, Inc., IP Division

(57) ABSTRACT

An apparatus includes a display control unit configured to cause a display screen to display a plurality of objects which include an object to be processed according to a moving operation; a selection unit configured to select at least one of the plurality of objects which are displayed, based on a position on the display screen; a determining unit configured to, in a case where an object different from the object to be processed is selected and the moving operation for the selected object is executed, determine whether to execute the predetermined processing to the object to be processed according to the moving operation, based on the selected object; and a processing unit configured to execute the predetermined processing for the object according to the moving operation, in a case where the determining unit determines that the predetermined processing is executed to the object.

24 Claims, 17 Drawing Sheets

(56) References Cited

U.S. PATENT DOCUMENTS

| | | | | |
|---|---|---|---|---|
| 9,465,531 | B2* | 10/2016 | Miyazaki | G06F 3/0488 |
| 2005/0024341 | A1* | 2/2005 | Gillespie | G06F 1/1616 |
| | | | | 345/173 |
| 2007/0273663 | A1* | 11/2007 | Park | G06F 3/04883 |
| | | | | 345/173 |
| 2008/0052945 | A1* | 3/2008 | Matas | G06F 3/0485 |
| | | | | 34/173 |
| 2008/0094367 | A1* | 4/2008 | Van De Ven | G06F 3/0414 |
| | | | | 345/173 |
| 2008/0168402 | A1* | 7/2008 | Blumenberg | G06F 3/04845 |
| | | | | 715/863 |
| 2009/0002335 | A1* | 1/2009 | Chaudhri | G06F 3/04815 |
| | | | | 345/173 |
| 2009/0064055 | A1 | 3/2009 | Chaudhri et al. | |
| 2009/0094562 | A1* | 4/2009 | Jeong | G06F 3/0486 |
| | | | | 715/863 |
| 2009/0228841 | A1* | 9/2009 | Hildreth | G06F 3/0304 |
| | | | | 715/863 |
| 2011/0061021 | A1* | 3/2011 | Kang | G06F 3/0481 |
| | | | | 715/800 |
| 2011/0107272 | A1* | 5/2011 | Aguilar | G06F 3/04815 |
| | | | | 715/853 |
| 2012/0019563 | A1 | 1/2012 | Misawa et al. | |
| 2013/0303143 | A1* | 11/2013 | Schrader | H04W 12/08 |
| | | | | 455/418 |
| 2017/0010782 | A1* | 1/2017 | Chaudhri | G06F 3/0482 |

FOREIGN PATENT DOCUMENTS

| | | |
|---|---|---|
| JP | 2008-145170 A | 6/2008 |
| JP | 2010-503082 A | 1/2010 |

* cited by examiner

INFORMATION PROCESSING APPARATUS, INFORMATION PROCESSING METHOD AND A NON-TRANSITORY STORAGE MEDIUM

CROSS REFERENCE TO RELATED APPLICATIONS

The present application is a Divisional of U.S. patent application Ser. No. 14/024,939 filed Sep. 12, 2013, which claims the benefit of priority from Japanese Patent Application No. 2012-203095 filed Sep. 14, 2012, each of which is hereby incorporated by reference herein in their entirety.

BACKGROUND OF THE INVENTION

Field of the Invention

The present invention generally relates to information processing and, more particularly, to an apparatus, a method and a non-transitory storage medium storing a program for executing a processing according to a user instruction.

Description of the Related Art

An information processing apparatus which inputs a user instruction by a coordinate input device (such as a touch panel) and executes a processing according to the instruction is familiar. In such information processing apparatus, the apparatus judges an operation such as touch, tap (touch and release), drag (trace), and flick that a user operates on a touch panel, and executes a processing according to the action. For example, it is familiar that when a user touches an object displayed on a display with a finger, the said object is selected, and the user have the object moved according to a moving of a finger (drag).

In a case that a user's operation corresponds to several kinds of operations, there is a technique which judges a processing to be executed according to the action of the user's operation. In Japanese Patent Application No. JP 2006-343856, even if a user touches an object when doing manual input, the information processing apparatus puts the manual input processing above others as long as a length of traces of a drag operation is larger than predetermined value. In the above-mentioned technique, in a case that traces of a drag operation from an object that a user touches is long, the processing is judged as the manual input. Therefore, in a case that a user executes a drag operation by mistake when selecting an object, a processing according to the drag operation (manual input) is executed against intention.

SUMMARY OF THE INVENTION

The present disclosure provides an information processing apparatus, an information processing method and a storage medium which executes appropriately a processing according to the moving operation, according to an object selected by the user's moving operation.

According to an aspect of the present disclosure, an information processing apparatus includes a display control unit configured to cause a display screen to display a plurality of objects which include an object to be processed according to a moving operation by a user; a selection unit configured to select at least one of the plurality of objects which are displayed by the display control unit, based on a position on the display screen which is instructed by a user; a determining unit configured to, in a case where an object different from the object to be processed is selected by the selection unit and the moving operation for the selected object is executed, determine whether to execute the predetermined processing to the object to be processed according to the moving operation, based on the selected object; and a processing unit configured to execute the predetermined processing for the object according to the moving operation, in a case where the determining unit determines that the predetermined processing is executed to the object.

Further features of the present disclosure will become apparent from the following description of exemplary embodiments (with reference to the attached drawings).

DESCRIPTION OF THE EMBODIMENTS

Various exemplary embodiments, features, and aspects of the disclosure will be described in detail below with reference to the drawings. Such as relatively positions of constituent elements and display screen set forth in the exemplary embodiments are not intended to limit the scope of the present disclosure.

Figure 1:
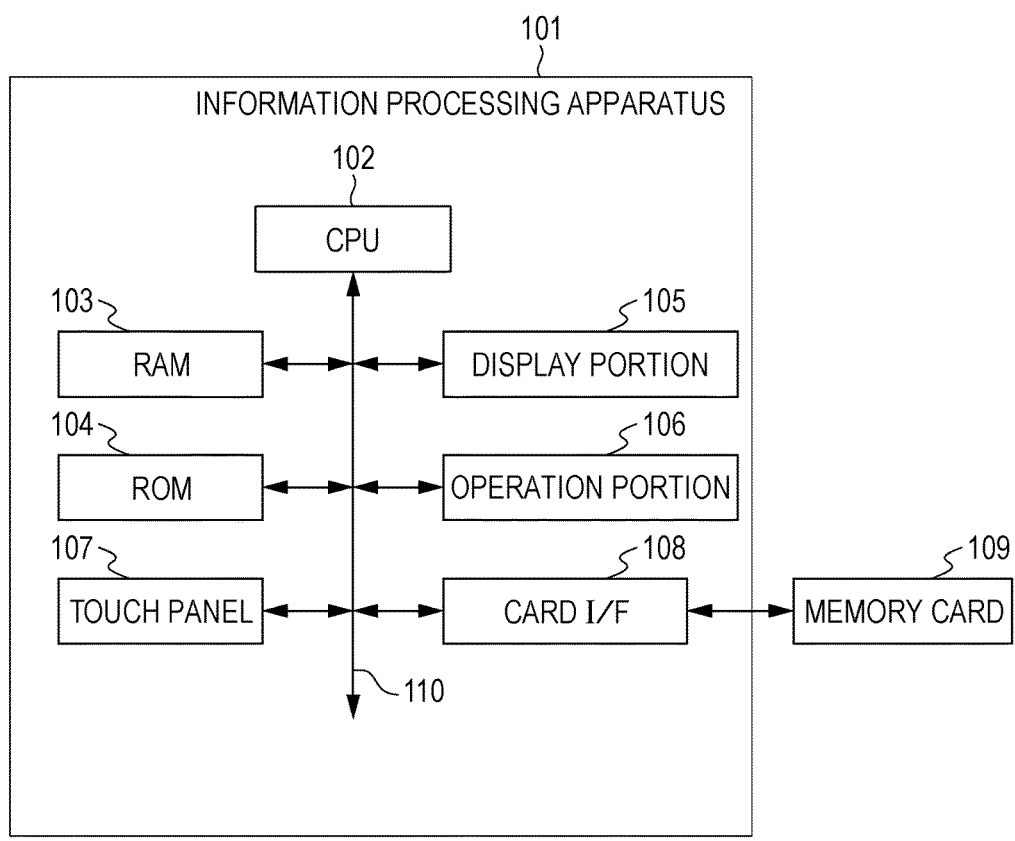
FIG. 1 is a diagram representing information processing apparatus according to the present embodiment.

FIG. 1 is a diagram representing a whole structure of an information processing apparatus 101 according to an embodiment. The information processing apparatus 101 includes a central processing unit (CPU) 102, a random access memory (RAM) 103, a read only memory (ROM) 104, a display portion 105, an operation portion 106, a touch panel 107, and a card interface 108. Those components are connected with each other via bus wiring 110.

CPU 102 controls the whole of the image processing apparatus 101. RAM 103 is comprised of non-transitory memory. RAM 103 stores such as a program control variable and provides a buffer area to store data temporally for a variety of works. ROM 104 is comprised of non-transitory memory. ROM 104 stores a control program and an operating system (OS) program that CPU 102 executes. CPU 102 executes various processing by executing a control program stored in ROM 104, RAM 103 as work memory as.

Display portion 105 is comprised of a display output device such as liquid-crystal display, and displays various information on a screen according to an instruction of CPU 102. The operation portion 106 corresponds to keys such as power unit key and stop key. The operation portion 106 accepts an instruction by a user. Card interface 108 reads image files and document files which are stored in memory card 109 which is attached, and executes writing date for memory card 109 and deleting data.

Touch panel 107 is able to detect a coordinate which is pressed. This touch panel is such as a capacitance touch panel. The touch panel 107 detects periodically whether a user touches or not. If the touch panel 107 is touched by a user, coordinate information representing coordinate which is touched on the touch panel 107 is entered to CPU 102.

The CPU 102 identifies a position that a user touches by the entered coordinate information. And the touch panel 107, CPU 102 can judge that a long-touch operation is executed by a user. In a case that a touch position is moving, CPU 102 can judge that a drag operation is executed by a user. At that time, CPU 102 can identify direction, distance and tracks of the drag operation by using the touch position. Furthermore, in a case that an input of the touch coordinate information from the touch panel 107 disappears, CPU 102 can judge that a user have a finger or a touch pen separated from touch panel 107 (release).

Figure 2A:
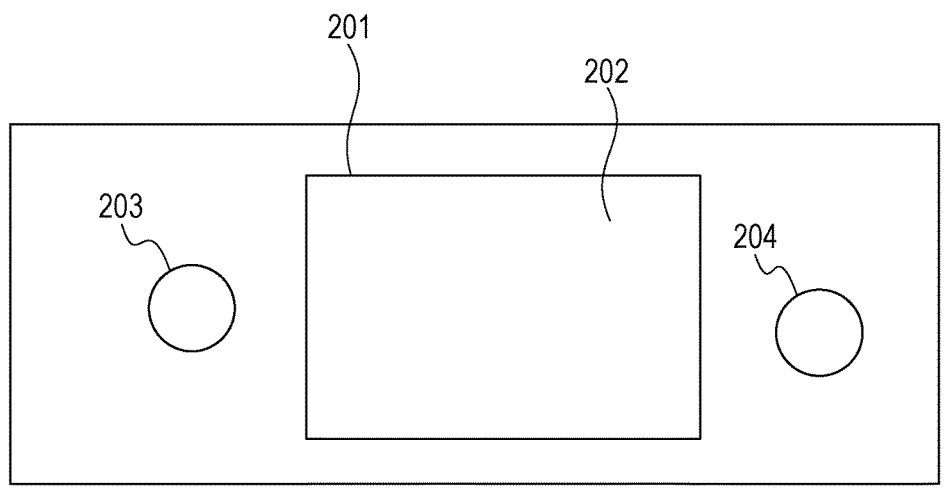
FIGS. 2A and 2B are appearance diagrams showing a composition example of a display portion 105 and an operation portion 106.
Figure 2B:
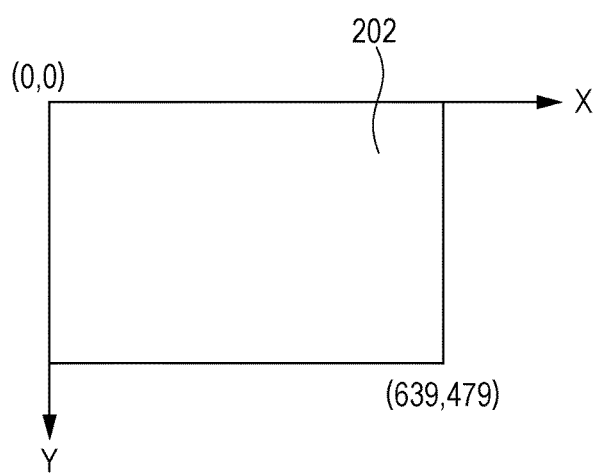

FIGS. 2A and 2B are diagrams showing a composition example of a display portion 105, an operation portion 106 and the touch panel 107. The display portion 105 may be a liquid crystal display (LCD), and a touch panel 202 which is equipped with operation structure is arranged on that display. Power source key 203 is used to turn on or turn off. Stop key 204 is a key to stop current operation. FIG. 2B is one example of coordinate axis on the touch panel. Upper left is set as a point of origin, X-axis is set in right direction, Y-axis is set in down direction. With respect to the method of setting axes, lower left may be set as a point of origin, besides the above-mentioned case.

Figure 3:
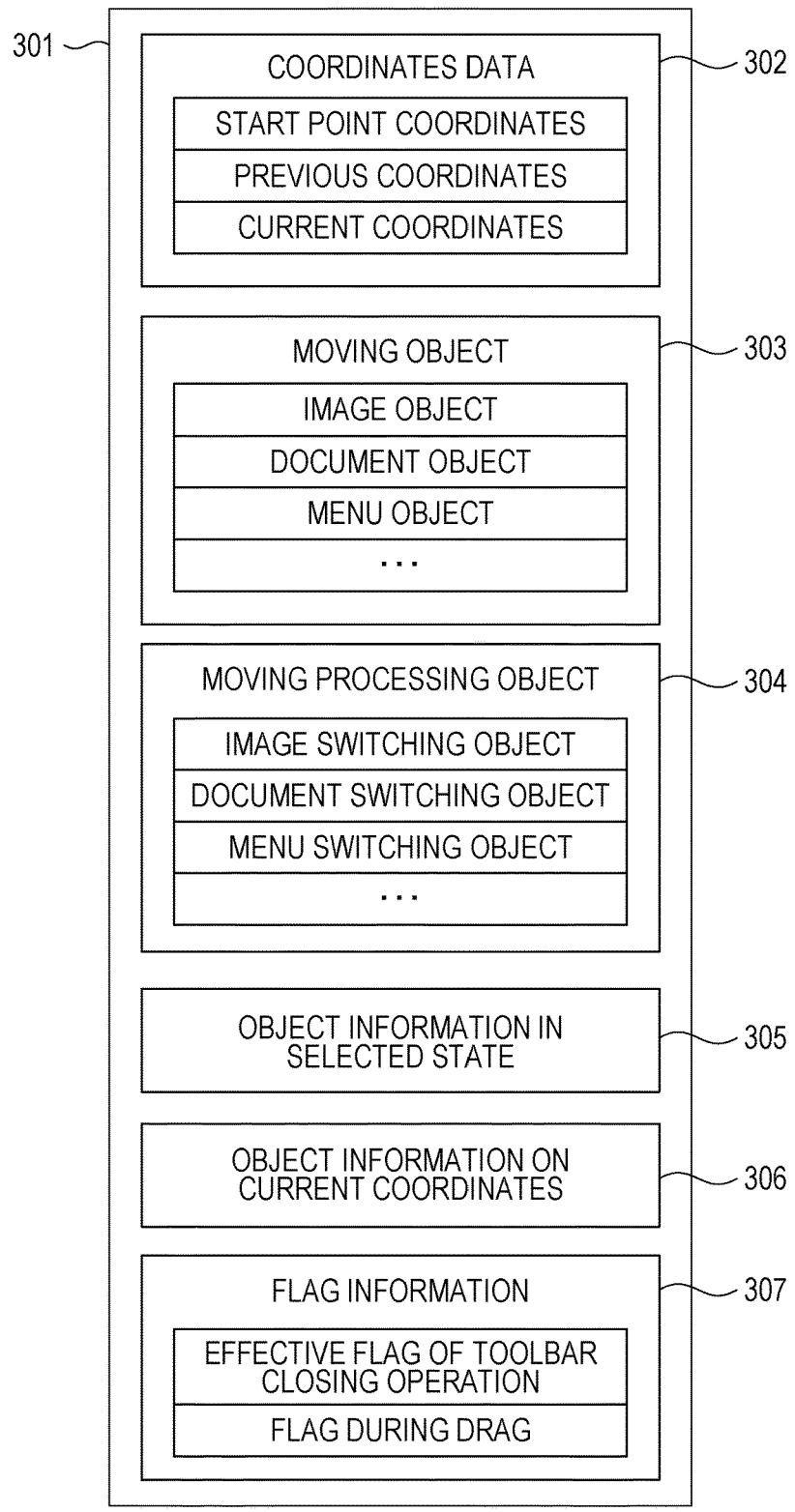
FIG. 3 is a diagram showing an example of a RAM 103.

FIG. 3 is a diagram showing a component example of a RAM 103. Number 103 represents RAM 103. Information about the coordinate is stored in a coordinate data 302, in concrete terms, a starting point of the touch operation, a current point and a last coordinate which is a previous point for the current point. Specific information about objects which are able to move on a screen by the drag operation is stored in a moving object 303. More concretely, information to specify position moving objects such as image object, document object, or menu object are stored. The above-mentioned specific information is information to specify each object, means such as individual number which is assigned to each object. Specific information about moving instruction object to instruct moving of the above-mentioned moving object is stored in a moving instruction object 304. For example, when a user taps the moving instruction object on the touch panel, CPU 102 moves the above-mentioned moving object on a screen of the display portion 201.

The specific information of an object which exists on a point of origin when a user touches on the touch panel 202 is stored in object information in a selected state 305. The specific information of the object arranged in the coordinate of the touch position on the touch panel at the present is stored in the object information 306. Necessary information to change a display data of the display portion 105 based on a operation by a user is stored in a flag information 307.

In the present embodiment, the moving object 303 is an image object, the moving instruction object 304 is an image changing object. The moving object and the moving instruction object is selected among the object to be displayed and the specific information of the selected object is stored in RAM 103, when CPU 102 have the display portion 105 displays objects.

Besides, the specific information of the object information on a current coordinate 306 is stored in RAM 103 by CPU 102. CPU 102 has the specific information of the object which is displayed on the display portion 105 and the coordinate information representing a coordinate that the object thereof is arranged on the screen stored in RAM 103. When the coordinate information is input by the touch panel 107, CPU 102 judges the object which is arranged on a coordinate corresponds to the touch position and store the specific information to each region of RAM 103.

Next, FIG. 4A to FIG. 6 illustrate that the processing which displays an image file stored in memory card 109 on the display portion 105 and changes an image to be displayed to the display portion 105.

Figure 4A:
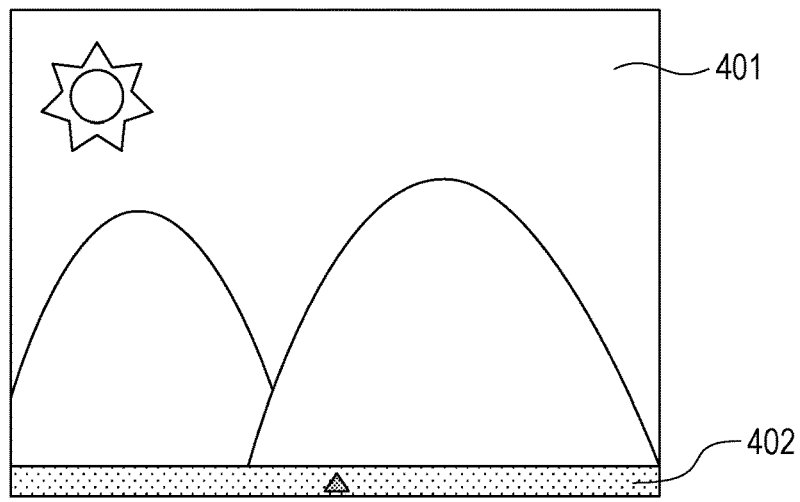
FIGS. 4A and 4B are diagrams showing a display example of an image displayed on a display portion 201.
Figure 4B:
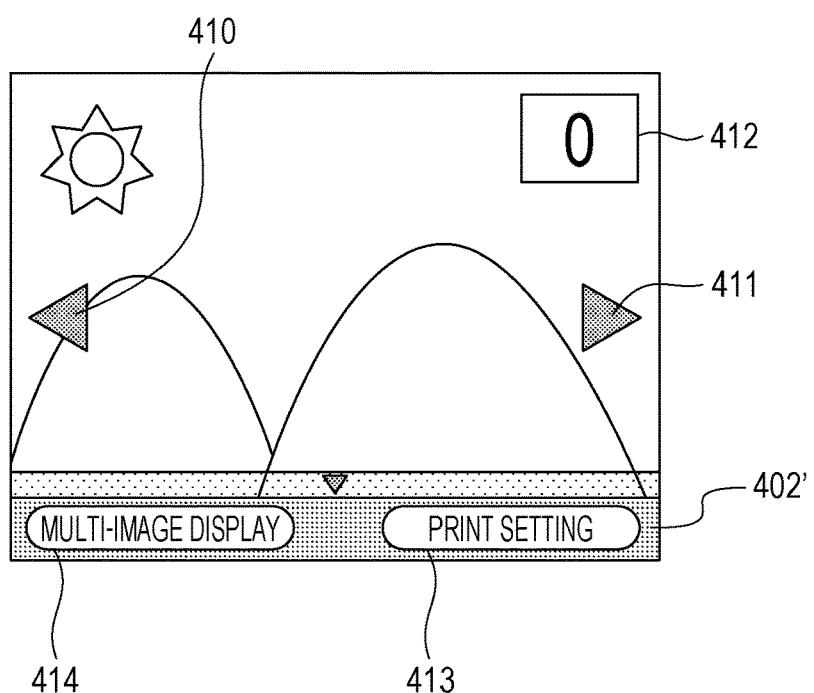

FIGS. 4A and 4B are diagrams showing a display example when displaying an image on a display portion 201. The number 401 is an image object. CPU 102 executes the display control by decompressing an image stored in a memory card 109 to RAM 103 and outputting the image decompressed to the display portion 105. A displayed image can be changed by a user touching the image object 401 with a finger and dragging it to a horizontal direction. The object does not move even if a user touches with a finger and executes a drag operation. That is, the image object 401 in the present embodiment is stored as the moving object, the specific information thereof is stored in the moving object 303. Objects except the image object 401 are non-moving objects.

Figure 5A:
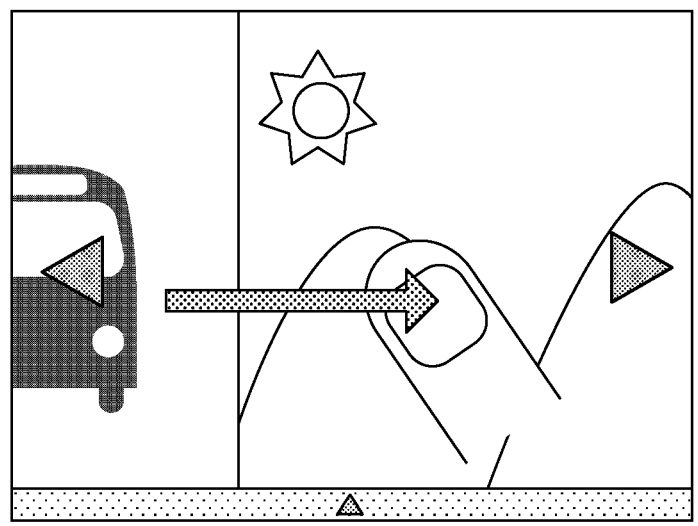
FIGS. 5A and 5B are diagrams showing a display example when executing a drag operation.
Figure 5B:
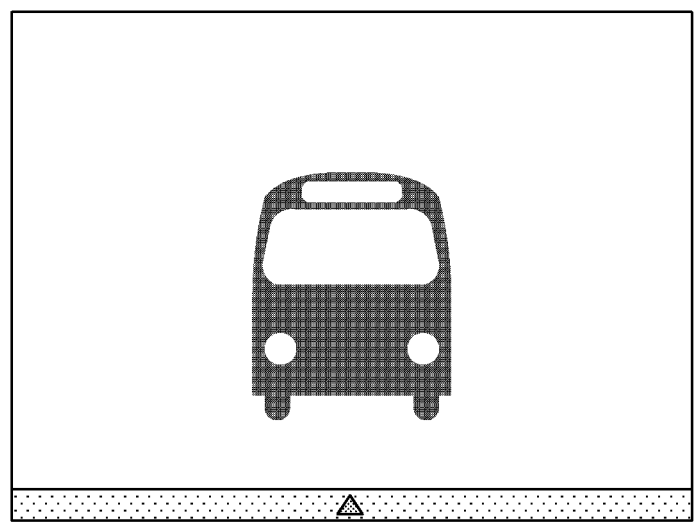

When a user drags image object 401, CPU 102 executes a moving control which moves the image to follow the drag operation. FIGS. 5A and 5B are diagrams showing a display example when executing a drag operation.

Shown as FIG. 5A, a part of each images of an image to be displayed and an image adjacent to the image thereof is displayed during a user continues a drag operation and does not release his/her finger from the touch panel 107. After the image move by a predetermined distance and a user have a finger released from touch panel 107, in a display portion 105 the adjacent image is displayed shown as FIG. 5B. If the image is not moved by a predetermined distance, CPU 102 cancels image forwarding and has the original image displayed.

A toolbar object 402 has two states, the opening state and the closing state, opening and closing states can be shifted by touching and releasing immediately (tapping) on a predetermined region of touch panel 202. Image switching objects 410 and 411 can forward an image by tapping. And images can be switched by a long-term touching this object. High-speed display mode is explained later by using FIG. 6.

Switching the image to be displayed by the drag operation or the image switching objects 410, 411, switching is performed according to a list of image files stored in memory card 109. This list includes the image file number and file-path information to access the image file, and is generated on RAM 103 by CPU 102. Numbering of the image files is, for example, in the order according to attributes of the image files (for example the photo date). CPU 102 selects the image file to be displayed on the display portion 105 among the image files included in the list as a candidate to be displayed, and shows the image on the display screen of the display portion by accessing according to the file-path information of the image file.

A number of print object 412 displays number of print. A number of print setting screen which is not illustrated is displayed by tapping the number of print object, and a number of print can be changed on the number of print setting screen. A print setting screen which is not illustrated is displayed by tapping a print setting object 413, sheet type or sheet size can be set.

A mode which displays a plurality of images on a screen, which is not illustrated, can be changed by tapping multi image display switching object 414. Types and portion of the object displayed on a screen is not limited. Another object may be displayed, and a display portion may be changed. And a part of objects may be displayed, for example only the number of print object 412 is displayed.

Figure 10:
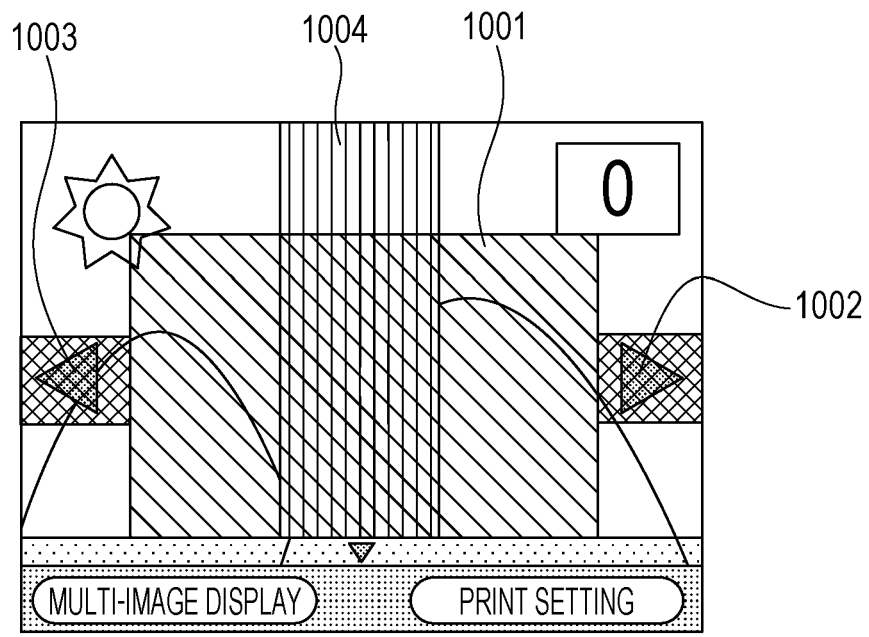
FIG. 10 is a diagram showing a region on a touch panel.
Figure 12:
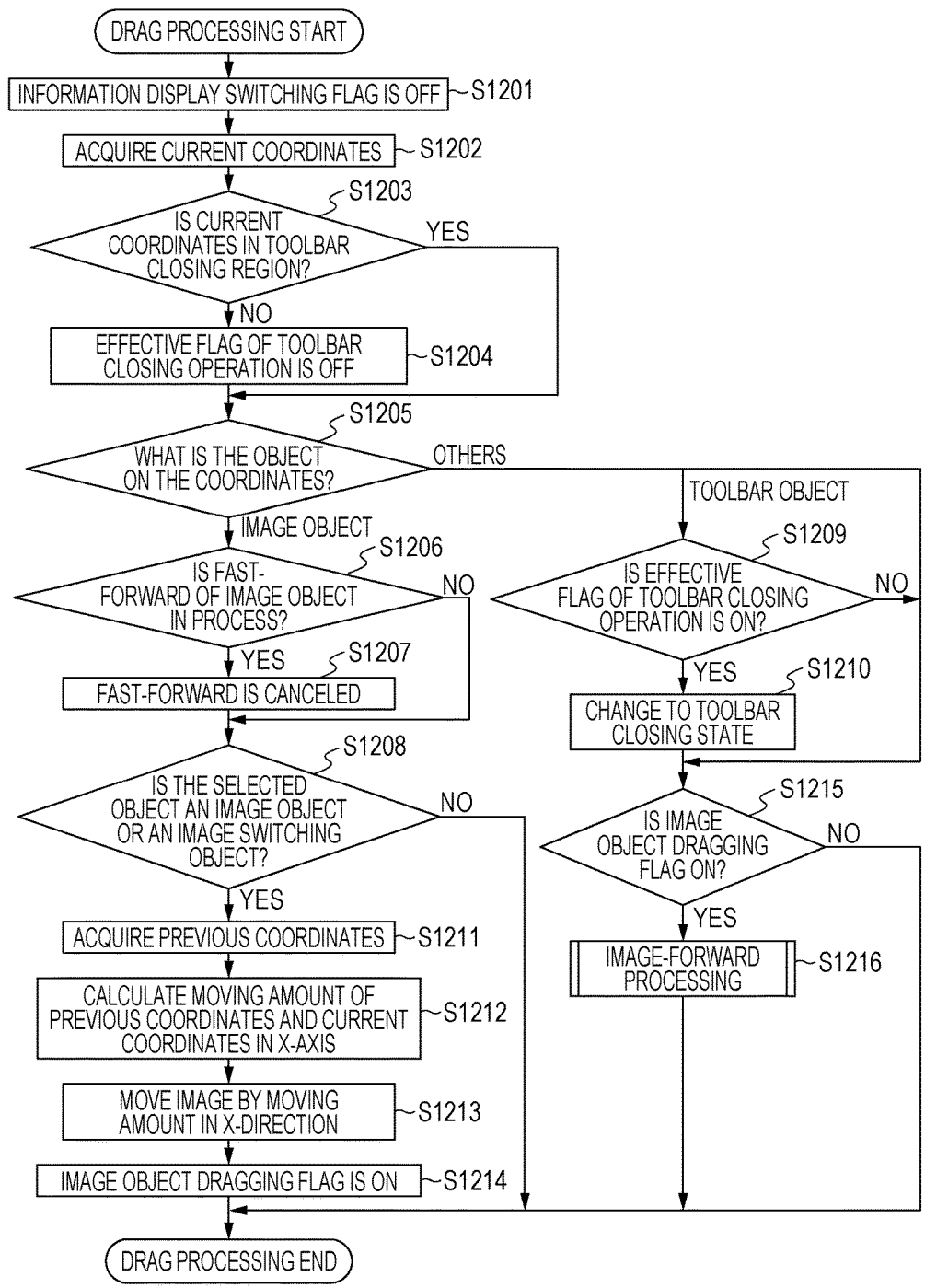
FIG. 12 is a flowchart showing contents of a processing when detecting a drag event.
Figure 13:
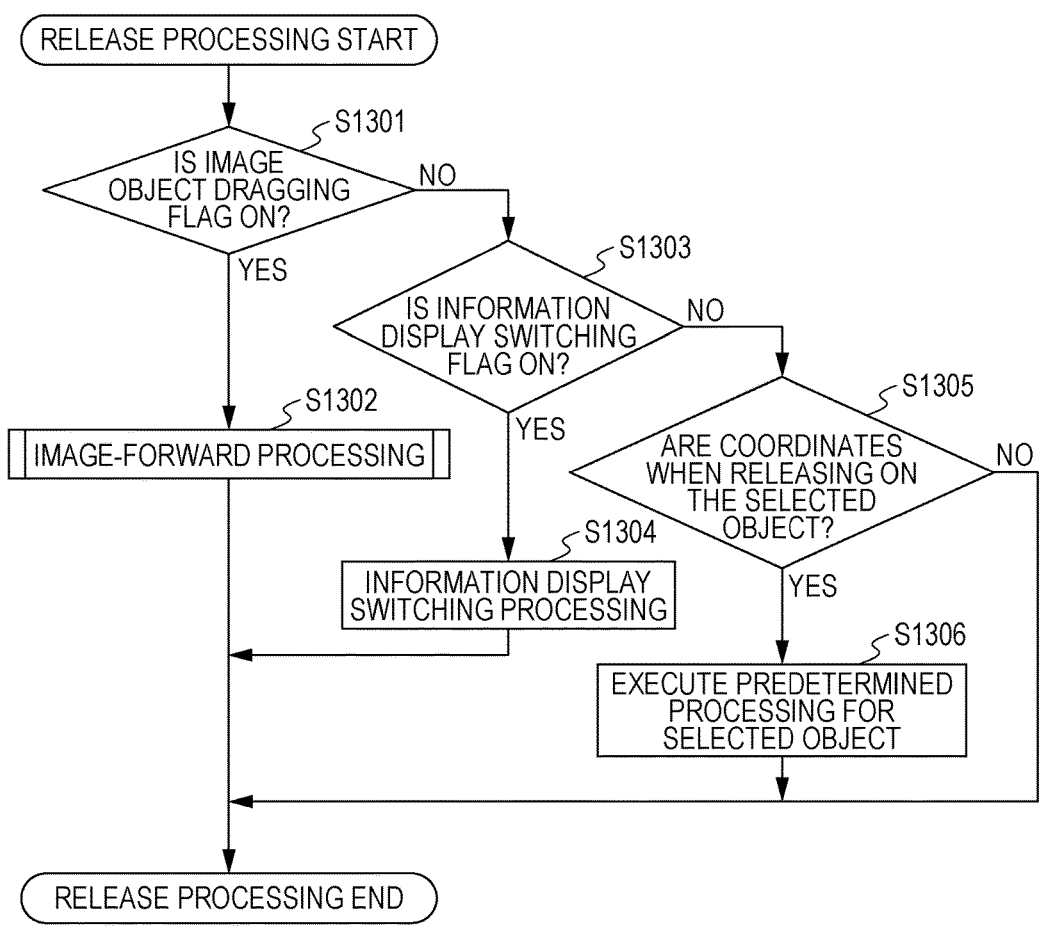
FIG. 13 is a flowchart showing contents of a processing when detecting a release event.

Those objects can be switched, to appear on the display, or not appear on the display. For example, those objects can be switched to appear or not by tapping a predetermined region of the screen or dragging on another region. FIGS. 10, 12, and 13 are used to explain a method in detail later. Furthermore, another method to alter display, the object can be changed to non-display after a predetermined period by a timer, which is not illustrated.

Figure 6:
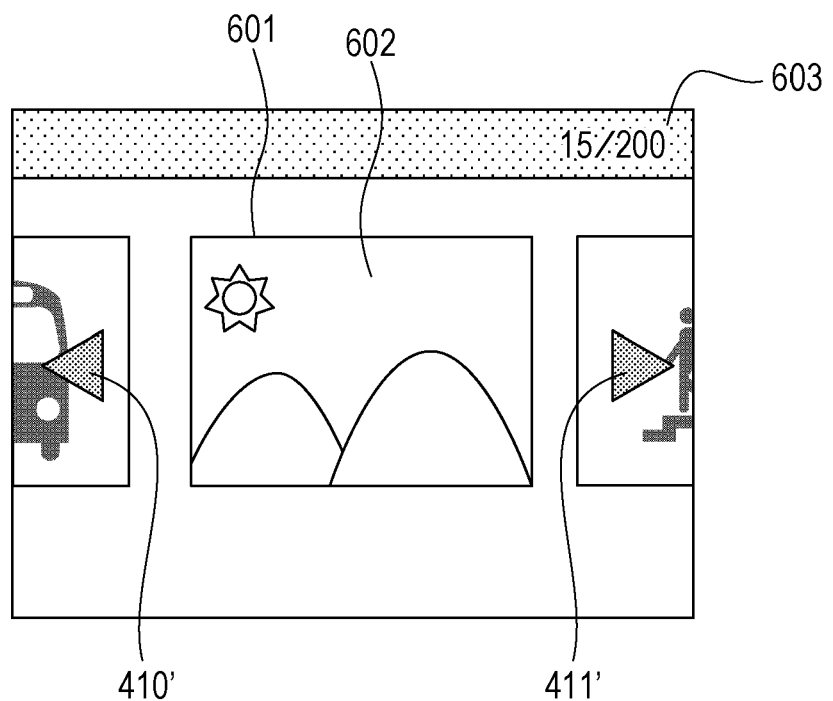
FIG. 6 is a diagram showing a display example when executing an image fast-forward processing.

FIG. 6 is a display example of a fast forwarding display mode. An image display region 601 is a region to display thumbnails of images that are stored in memory card 109. For example, in a case that JPEG files taken by digital still camera are stored in memory card 109, there is a possibility that two picture images that differs in the number of pixels and are from the same contents may be included in a file.

Image counter 603 displays the total number of images of memory card 109 and an image number that is displayed currently. In an example shown in FIG. 6, there are two hundred image files in the memory card, $15^{th}$ image is displayed among those. Images are switched while the user is pushing down image switching object 410' and 411', a display of the image counter is updated. The image counter may be increased and decreased by 1, or may be increased and decreased by 10 if the fast forwarding display mode continue for a predetermined period.

Figure 7:
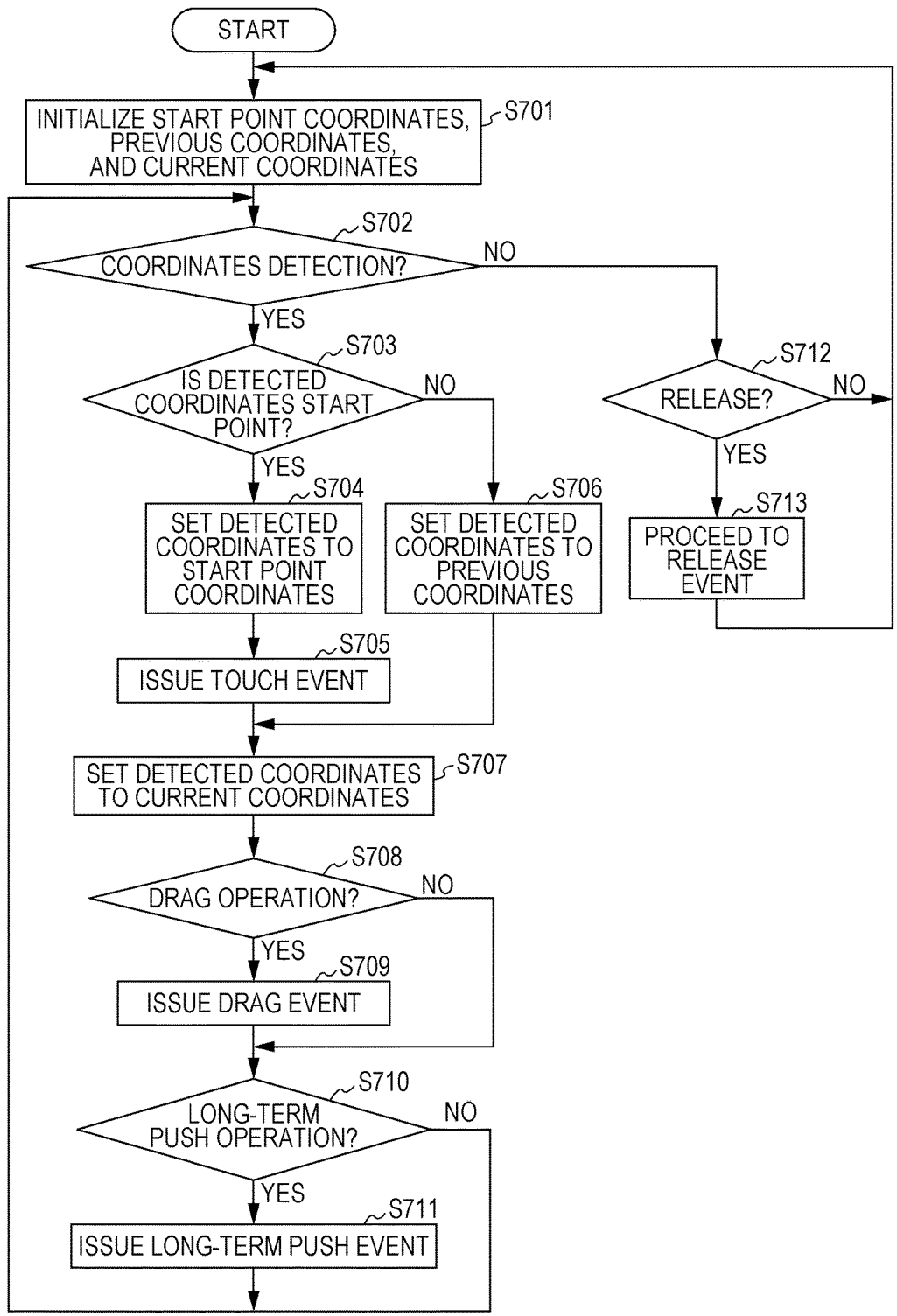
FIG. 7 is a flowchart showing an event judgment processing.

Next, FIG. 7 is used to explain a processing to judge an event which occurs when the touch panel 107 is touched by a user.

FIG. 7 is a flowchart showing an event judgment processing. In S701, an initialization of coordinate information stored in RAM 103 (a start point coordinate, a previous coordinate, a current coordinate) is performed. The start point coordinate means a coordinate where a touch is started. The current coordinate means a coordinate that is detected currently, the previous coordinate means a coordinate that is previous to the current coordinate. As mentioned above, coordinates of touch position are entered to CPU 102 periodically.

In S702, CPU 102 reads a coordinate register of the touch panel 107, and judges whether or not the coordinate of touch position is detected. With respect to timing of detecting a coordinate, CPU 102 may read the coordinate register of the touch panel 107 every predetermined interval. A hardware interrupt occurs when detecting a coordinate, CPU 102 may read the coordinate register at that timing.

In a case that the coordinate or touch position is detected in S702, the process proceeds to S703. In a case that the coordinate or touch position is not detected in S702, the process proceeds to S712. In S703 CPU 102 judges whether or not the detected coordinate is the start point coordinate. If the detected coordinate is the start point coordinate, the process proceeds to S704. If the detected coordinate is not the start point coordinate, the process proceeds to S706. In S706, the current coordinate stored in RAM 103 is set to the previous coordinate, and the process proceeds to S707.

In S704, the detected coordinate is set to the start point coordinate. In S705, a touch event showing a start point detection is issued. In S707, the detected coordinate is set to the current coordinate and is stored in RAM 103. In S708, a drag operation judgment is performed. In concrete terms, CPU 102 compares the current coordinate with the previous coordinate and calculates differences of coordinates. In a case that the difference is larger than a predetermined value in one of X-axis or Y-axis, CPU 102 judges the drag operation. If a drag operation is judged, a drag event is issued in S709. If a user continues to perform the drag operation on the touch panel 202, drag event is issued a plurality of times.

In a case that drag operation is not judged, the process proceeds to S710. In S710, a judgment of a long-term touch operation is performed. In concrete terms, in a case that a touch state continues for a predetermined period, and the detected coordinate fall within a predetermined region for that period, CPU 102 judges long-term touch operation. If a long-term touch operation is judged, the long-term touch event is issued. The long-term touch event is issued every predetermined interval by continuing to touch on a predetermined region of the touch panel 202 by a user.

In S712, CPU 102 judges whether or not a touch by a user is released. In concrete terms, if the previous coordinate is detected, CPU 102 judges that a finger of a user is released from the touch panel 202 after the last detection of coordinates, and judges a release. If the previous coordinate is not detected, CPU 102 does not judge a release because a user releases a finger from the touch panel 202 before that time. In a case that a release is judged, the process proceeds to S713 and a release event is issued. In a case that a release is not judged, the process goes back to S701. Each event which is issued in S705, S709, S711, and S713 is used to change a display of the display portion 105.

Next, FIGS. 8 to 15F are used to explain processes when detecting an event.

Figure 8:
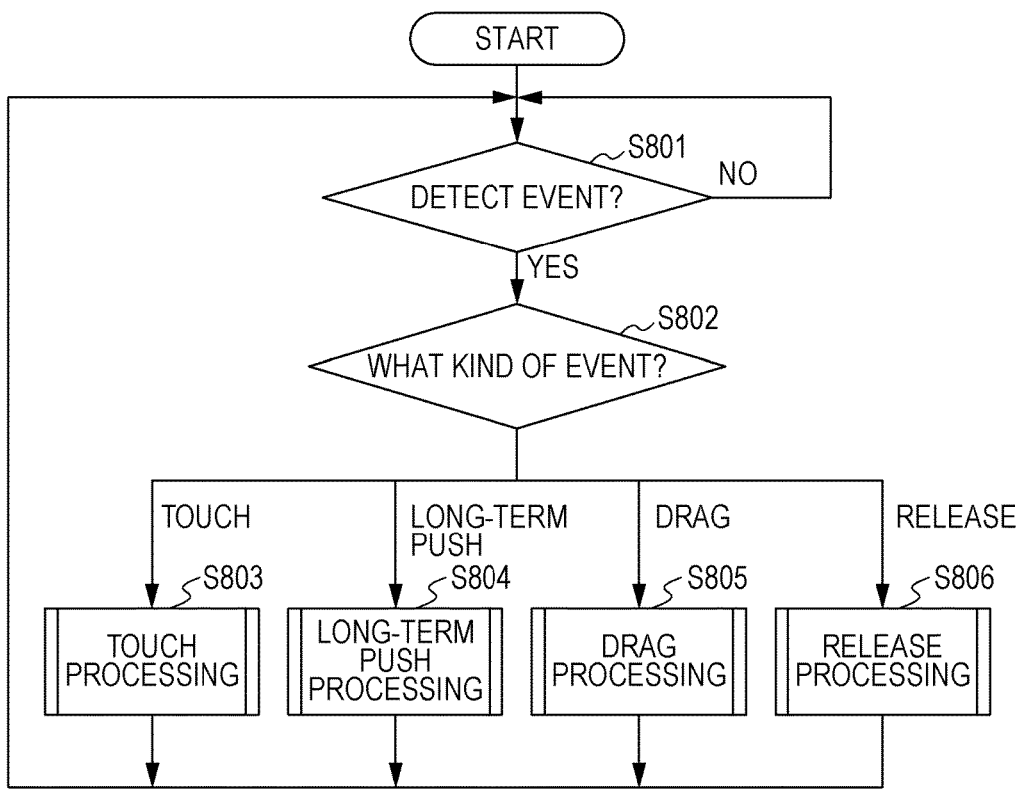
FIG. 8 is a flowchart showing contents of a processing when detecting an event.

FIG. 8 is a flowchart showing contents of a processing when detecting an event. In S801, CPU 102 checks whether or not an event occurs by a processing that is explained by using FIG. 7. In a case that CPU 102 detects the event, the process proceeds to S802. In S802, the processing is assigned to S803 on to S806 depending on the kind of the event. In S803 to S806, in a case that the event is a touch, long-term touch, drag, or release, a processing according to the event is performed. Details of the processing in each of S803 to S806 are explained later by using FIGS. 9 to 15F. After the processing in S803 to S806, the process goes back to S801 and takes an event waiting state. As explained with FIG. 7, there is a case that CPU 102 detects the long-term touch event and the drag event a plurality of times.

Figure 9:
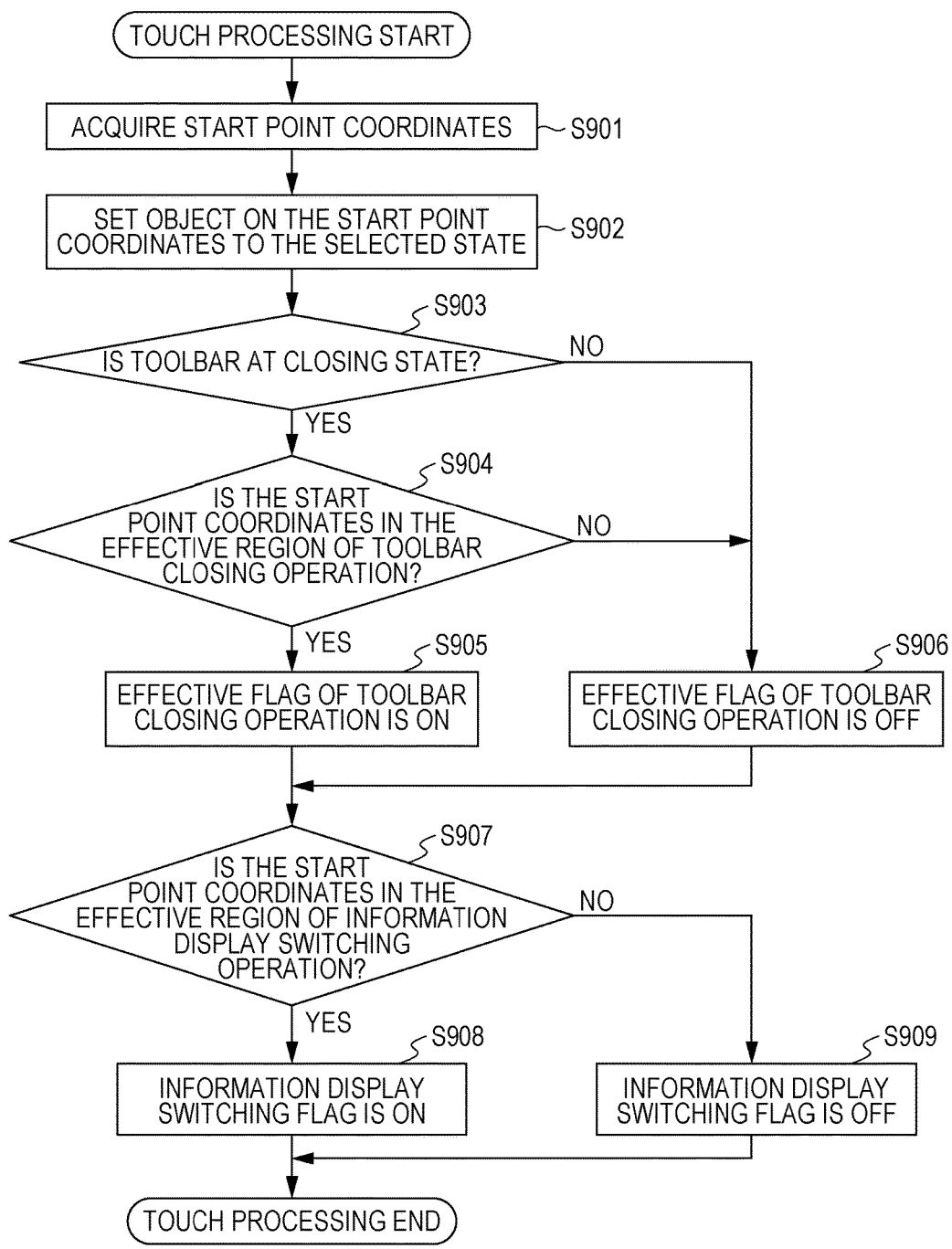
FIG. 9 is a flowchart showing a processing when detecting a touch event.

FIG. 9 is a flowchart showing a processing when detecting a touch event in S803 of FIG. 8. In S901, the start point coordinate that is stored in RAM 103 in S707 of FIG. 7 is acquired. In S902, the object on the start point coordinate is specified, that object becomes to be in a selected state. In concrete terms, the specific information to specify the selected object is stored in the object information in a selected state 305. The specific information to specify the selected object may be information to specify the selected object such as the number which is assigned to each object or a string of the object name. The information for the selected object is used to such as the long-term period push processing or the drag processing which are explained later.

The object in a selected state in S902 may be an object in a non-displayed state. As mentioned above, the object such as the image switching objects 410 and 411 may become to a non-displayed state after a predetermined period has passed. In that case, there is a possibility that the predetermined period passed and the image switching objects become to a non-displayed state when a user tries to touch them. If it is set that an object in a displayed state can be selected, there is a case that the image forwarding cannot be performed because the object is in the non-displayed state, even though a user tries to touch the image switching object to perform image forwarding. Therefore, for an object turned to the non-displayed state after the passage of a predetermined period, the object in the non-displayed state may become to a selected state.

S903 to S906 are steps to judge whether or not an operation by a user is an operation to close the toolbar object 402 of FIG. 4. In S903, the opening state and closing state of the toolbar object 402 is acquired. If in the opening state, the process proceeds to S904. If in the closing state, the process proceeds to S906. In 904, it is judged whether or not the start point coordinate which is acquired in S901 is within an effective range of a closing operation of the toolbar.

FIG. 10 is a diagram showing a region on the touch panel 107, an example of the effective range of a closing operation of the toolbar is showed as 1004 of FIG. 10. This is a region set assuming that a user drags down from center of the screen when closing the toolbar by the drag operation. Size and arrangement of the region is not limited to the above example. If the start point coordinate is out of the range of a closing operation of the toolbar 1004, it is judged that the operator does not intend to close the toolbar, an effective flag of the closing operation of the toolbar is turned off in S906, a flag state is stored in RAM 103. If the start point coordinate is within the range of a closing operation of the toolbar 1004, it is judged that there is a possibility of a user intent to close operation of the toolbar, an effective flag of the closing operation of the toolbar is turned on in S905, a flag state is stored in RAM 103. This flag is referred in a drag processing flow of FIG. 12, in a case that a predetermined condition is satisfied, the toolbar is changed to the closing state. The detail is explained later by using FIG. 12.

S907 to S909 are steps to switch the toolbar object between display and non-display state, the image switching object 410, the number of print object 412 of FIG. 4. The objects to switch between display and non-display are not limited to the above mentioned one. All objects besides the image object 401 may be set, the number of print object 412 may be exempt if the number of print is set to more than 1 in the number of print object 412.

In S907, it is judged whether or not the start point coordinate is in an information display switching region. An example of the information display switching region is shown as 1001 of FIG. 10. In a case that a user performs the tapping operation in the information display switching region, the switching ON and OFF of a various kinds of the above information display can be performed. Size and arrangement of the information display switching region is not limited to the above example. If the start point coordinate is inside the information display switching region in S907, an information display switching flag is turned on in S908. If the start point coordinate is out of the information display switching region, the information display switching flag is turned off in S908, and a flag state is stored in RAM 103. This flag is referred in a release processing flow of FIG. 13. In a case that a predetermined condition is satisfied, a processing to switch images to be displayed is performed. A detail is mentioned later by using FIG. 13.

Figure 11:
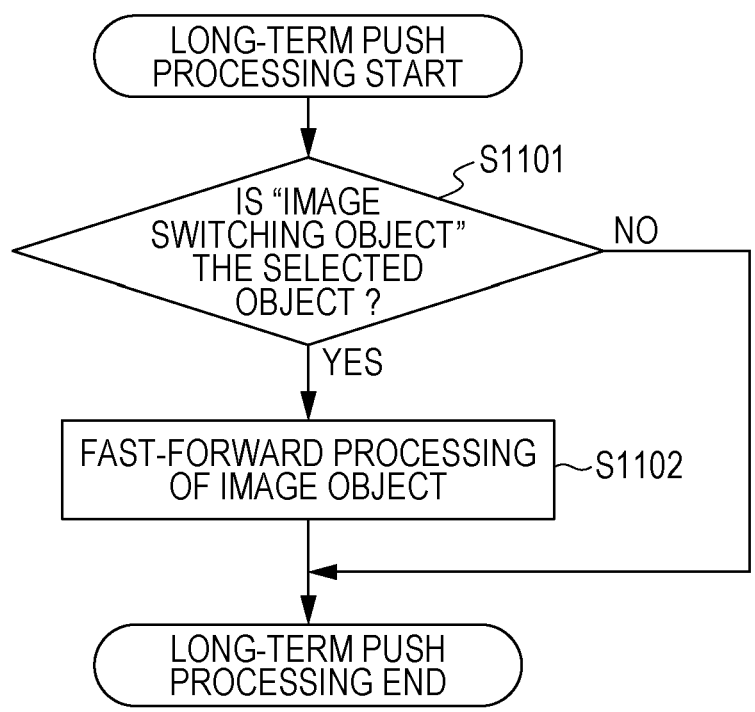
FIG. 11 is a flowchart showing a processing when detecting a long-term touch event.

FIG. 11 is a flowchart showing contents of a processing when detecting a long-term touch event in S804 of FIG. 8. In S1101, the specific information the selected object which is stored in RAM 103 in S902 of FIG. 9 is acquired in S1101, it is judged whether or not the selected object is the image switching object. If it is an image switching object, the process proceeds to S1102. If it is not an image switching object, the present flow is completed.

In S1102, the image fast-forward processing is performed. The image fast-forward processing is already explained in FIG. 6. The switching of images is performed easily and quickly by executing the long-term touch processing, without tapping on the image switching objects 410 and 412 several times by a user.

FIG. 12 is a flowchart showing contents of a processing when detecting a drag event in S805 of FIG. 8. The information display switching flag is stored in RAM 103 in S908 and S909 of FIG. 9 is turned off in S1201, the flag state is stored in RAM 103.

In the present embodiment, in a case that the drag operation is detected, it is judged that an user's intent is not to switch images, because switching images are performed by the tap operation. If a user taps on the information display switching region when various information such as the number of print are displayed, the above information becomes non-display state. By turning off the information display switching flag when the drag operation is judged in S1201, one can prevent information such as the number of print turned to non-display state after forwarding images.

In S1202, the current coordinate which is stored in RAM 103 in S701 of FIG. 7 is acquired, the process proceeds to S1203. In S1203, it is judged whether or not the current coordinate is in the toolbar closing region 1004. If in the region, the process proceeds to S1205. In not in the region, the effective flag of the toolbar closing operation is turned off in S1204, the flag state is stored in RAM 103.

In S1205, an object on the current coordinate is acquired. In a case that the object on the current coordinate is the image object 401, the process proceeds to S1206. If the toolbar object 402 or 402', the process proceeds to S1209. If other objects, the process proceeds to S1215. In S1206, it is judged whether or not the image fast-forward processing is executing. In a case that the image fast-forward processing is not executing, the process proceeds to S1208.

In S1208, the object information in a selected state which is stored in RAM 103 in S902 of FIG. 9 is acquired. And it is judged whether or not the image object 401 or the image switching object 410, 411 is selected when touching S902 of FIG. 9, with the object information which is acquired. If the image object 401 or the image switching object 410, 411 is selected, a moving processing of image by the drag operation is performed in S1211 to S1213. If other objects, the present flow is completed.

In this way, in S1208, in a case that it is judged that not only the image object but also the image switching object 410, 411 is selected as selected objects, the moving processing by the drag operation is performed. Even if a user touches on the image switching object by mistake when performing the drag operation of image, the image can be moved by the drag operation.

It is judged that a drag operation of a user does not express the user's intent to perform the moving processing of image if the object is touched when performing a touch and the moving processing of image is not performed. In a case that a touch on objects such as the toolbar object 402 and the number of print object 412, and performing a drag operation to image object is performed, the moving processing of image is not performed. By this way, it can prevent the image forwarding performed against the intention of a user.

In the present embodiment, as shown in FIG. 4A, the image switching objects 410 and 411 are arranged in right and left of the middle. Therefore, in a drag operation for the image object in right and left, there is a case that a user touches the image switching objects 410 and 411 by mistake. In S1208, even if the drag operation is performed after touching the image switching objects, the moving processing of the image by a drag operation is performed.

However, a condition to judge whether or not the moving processing of the image by the drag operation is performed is not limited to the above example. For example, when the drag operation for the image object is performed after an object arranged on a predetermined coordinate is touched, the moving processing of the image by the drag may be performed.

In S1211, the previous coordinate which is stored in RAM 103 in S710 is acquired, the process proceeds to S1212. In S1212, a moving distance between the previous coordinate and the current coordinate in X-direction is calculated, the process proceeds to 1213. In S1213, the image is moved by the distance which is calculated in S1212. In S1214, a flag during the image drag is set to ON, the flag state is stored in RAM 103. This flag as referred to a release processing in FIG. 13, is used to judge whether or not the image forward processing is performed.

On the other hand, in a case that the object on the current coordinate during the drag operation is the toolbar object in S1205, the process proceeds to S1209. In S1209, the effective flag of the toolbar closing operation which is stored in S905 and S906 of FIG. 9 and S1204 or FIG. 12 is referred. If the flag is ON, the process proceeds to S1210. If the flag is OFF, the process proceeds to S1215. That is, when the toolbar closing region 1004 is touched, the drag operation in the down direction, and the toolbar object 402' is touched, S1201 is performed and the state is changed to the toolbar closing state. By this way, even if sizes of the toolbar object (opening state) 402' is small and it is hard for a user to touch, it becomes easy to change to the toolbar object 402' the closing state by the drag operation. In the present flow, it is explained to perform a processing which changes the opening state to the closing state of the toolbar object 402. However it is possible to change the closing state to the opening state. For example, it is possible to change to the opening state, by performing the tap operation on the toolbar object (closing state) 402, or by performing the drag operation from the bottom portion upwards on the touch panel. After S1210 is performed, the process proceeds to S1215.

In S1215, the flag during the image drag is stored in RAM 103 in S1214 is acquired. If the flag is ON, the process proceeds to S1216. If the flag is OFF, the process is completed. That is, in a case that an object other than the image object is touched during the image drag, the image forward processing in 1216 is performed. By this way, the image forward is performed, even if the image switching object 411, 412 and the toolbar object 402 are touched. The image forward processing is explained later in FIG. 14.

FIG. 13 is a flowchart showing example of the release processing in S806 of FIG. 8. In S1301, the flag during the image drag is stored in RAM 103 in S1214. If the flag is ON, the process proceeds to S1302. If the flag is OFF, the process proceeds to S1303. In S1302, the image forward processing is performed. It is explained later by using FIG. 14. In S1303, the effective flag of the information switching is checked. If the flag is ON, the process proceeds to S1304. If the flag is OFF, the process proceeds to S1305. As shown in S1201 of FIG. 12, the information switching flag is turned to flag OFF, in a case that the drag processing is performed. Therefore S1304 is performed and the switching operation of the image to be displayed is performed, in a case that a user touches on the information switching region and releases without dragging. In S1304, as shown in FIGS. 4A and 4B, ON and OFF of the information display are switched.

In S1305, it is judged whether or not the coordinate which is assigned at the time of release exists on the selected object which is selected in S902. In a case that the coordinate exists on the selected object, a predetermined processing for the selected object is performed in S1306.

For example, in a case that the selected object is the image switching object, switching the image to be displayed is performed. In a case that the selected object is the number of print object, the screen for a user to instruct the number of print is displayed on the display portion 105. Switching the image is performed according to the list of the image file. That is, in the list, the image which is previous or next to the image to be displayed currently is the new image to be displayed. In a case that the image switching object 410 is selected, the previous image is displayed. In a case that the image switching object 411 is selected, the next image is displayed.

And, in S1305, if the coordinate at the time of release is not on the selected object, a predetermined processing for the selected object is not performed, and the process is completed. That is, after a user touches the object, selection of the object is cancelled by the drag operation.

On the other hand, as explained in S1208, in a case that the image switching object is selected, a moving of the object by the drag operation is performed with the drag operation by a user. Therefore, a user can cancel the selection of the object by the drag operation after touching the selected object as mentioned above. And a user can perform the image forwarding, in a case that a user performs the drag operation, after touching the image switching object. With respect to touching the image switching object, the image forward is performed by the drag operation, because a user touches the image switching object by mistake when performing the drag operation for the image forward. As shown FIG. 4B, there is a possibility that the image switching object is touched by mistake, because the image switching object is arranged in the middle of the screen.

Figure 14:
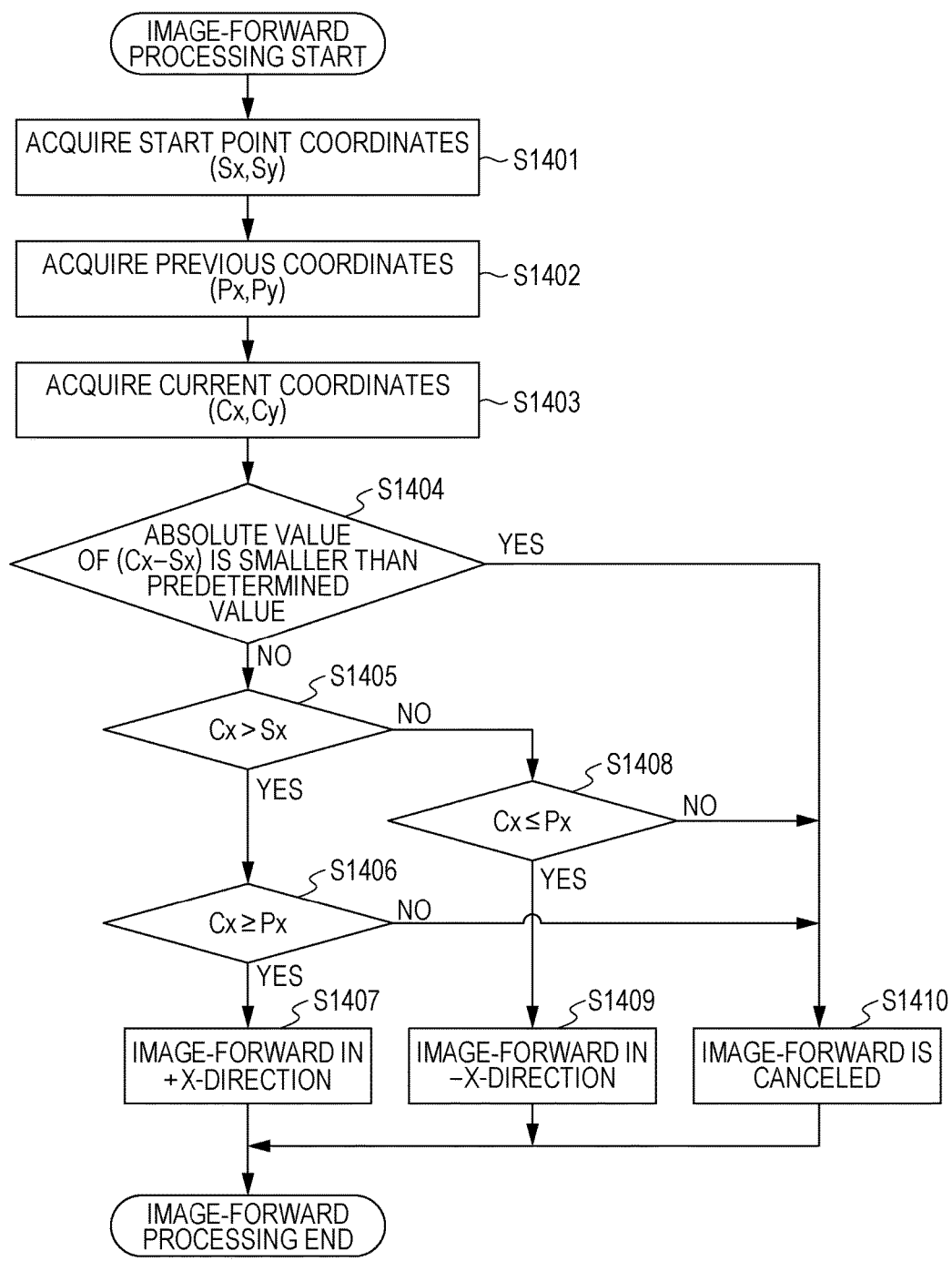
FIG. 14 is a flowchart showing contents of a fast-forward processing.

FIG. 14 is a flowchart showing an image-forward processing of S1216 of FIG. 12 and S1302 of FIG. 13. And FIGS. 15A to 15F are diagrams showing an example of a drag operation. In S1401, the start point coordinate (Sx, Sy) is acquired. In S1402, the previous coordinate (Px, Py) is acquired. And in S1403, the current coordinate (Cx, Cy) is acquired. A coordinate which is detected before releasing is used as the current coordinate when releasing. In S1404, a difference between the current coordinate and the start point coordinate in X-axis is calculated. If the difference of X-axis is smaller than a predetermined value, the image-forward is canceled. If the difference is larger than the predetermined value, the process proceeds to S1405. That is, when a moving amount of X-direction is small, it is judged that the intention of a user is the image-forward, the image-forward is canceled. For example, in a case that a user performs a drag operation in Y-direction from center of a screen for performing a toolbar closing operation, the image-forward without intention is prevented, because the image-forward is not performed even if there is a small shaking in X-coordinate.

In S1405, S1406, and S1408 are steps for judging whether or not the image-forward is performed based on the X-vector of the end of a drag track. In S1405, X-coordinates of the current coordinate and the start point coordinate are compared. If Cx>Sx, the process proceeds to S1406. If not, the process proceeds to S1408. FIGS. 15A to 15F are examples of a drag operation for explaining the image-forward processing. Here, it is supposed that every figure shows a case that value of Cx−Sx is larger than a predetermined value, that is, the drag operation is an operation that is judged as "NO" in S1404. For example, if the drag operation is a drag operation which is shown as FIG. 15A, 15B, or 15E, the process proceeds to S1406. And, if the drag operation is a drag operation which is shown as FIG. 15C, 15D, or 15F, the process proceeds to S1408.

Figure 15A:
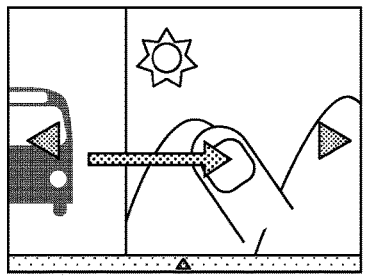
FIGS. 15A through 15F are diagrams showing an image a drag operation example of an image forward processing.
Figure 15B:
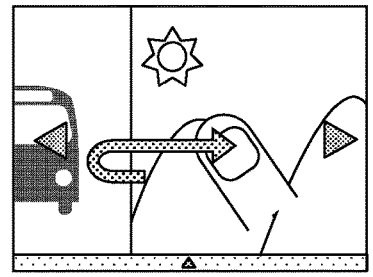
Figure 15C:
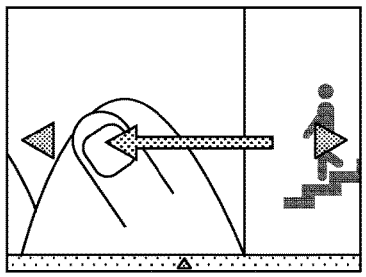
Figure 15D:
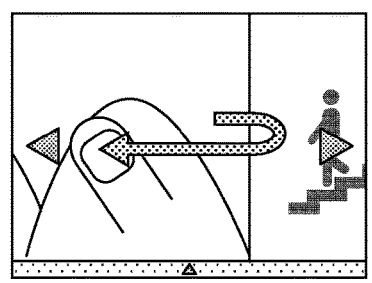
Figure 15E:
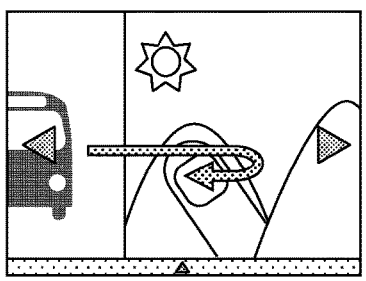
Figure 15F:
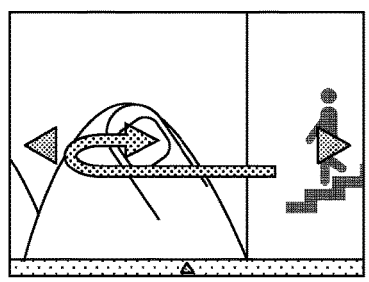

S1406 and S1408 are steps for calculating a moving direction vector of the end of the drag operation and judging whether or not a user intends to cancel the image-forward. In S1406, the X-coordinate of the current coordinate and the previous coordinate are compared. If Cx<=Px, the process proceeds to S1409. If not, the process proceeds to S1410. For example, if the drag operation is a drag operation which is shown as FIG. 15C or 15D, the process proceeds to S1409. And, if the drag operation is a drag operation which is shown as FIG. 15F, the process proceeds to S1410. That is, as shown in FIGS. 15E and 15F, even if once the drag operation is performed in X-direction (−X-direction) but the last vector is −X-direction (X-direction), the image-forward is able to be canceled. Therefore, in a case that a user wants to cancel, a user can cancel the image-forward without returning the drag operation nearby the start point coordinate. In S1407 the image is forwarded to +X-direction (right direction), in S1409 the image is forwarded to −X-direction (right direction), in S1410 the image-forward is canceled, and the present flow is completed.

In the above embodiment, if the object which is selected by a user touching is the image switching object, change of the image to be displayed is performed by a drag operation. Therefore, even if a user touches the image switching object by mistake when performing the image-forward by the drag operation, the image-forward is performed appropriately.

And, even if a user intends to tap the image switching operation but performs a drag operation by mistake, the image-forward by a drag operation, which is similar to a processing by the image switching object (switch of the image to be displayed), is performed. Therefore, a processing corresponds to a drag operation by a user can be performed, which reflects the user intention.

On the other hand, even if a user performs the drag operation after touching the number of print object 412, for example, the image to be displayed is not changed. Therefore, in a case that a user performs the drag operation by mistake when an instruction of the number of print object 412, it prevents the image to be displayed changed without the user intention.

And, when an object other than the number of print object 412, the image object, or the image switching object is selected, a processing by a drag operation is not performed. Therefore, even if a user touches an object by mistake, the touch is able to be canceled by a drag operation. That is, it is prevented that the image to be displayed is changed by a drag operation without user intention or the screen for setting the number or print is displayed.

In a case that the drag operation is performed after touching and selecting the object other than the image object and image switching object, a processing for the selected object may be performed.

And, in the above embodiment, it is judged whether or not the image-forward by a drag operation is performed, based on the arrangement position of the object which is selected by touch of a drag operation on a display screen. But, not being limited with these possibilities, the above judgment may be performed, according to the kind of the object which is selected by touch of the drag operation.

Furthermore, in the present embodiment, if the information display switching region 1001 is touched and released by a user, display of information such as the number of print object 412 is able to be turned ON/OFF as shown in S1304 of FIG. 13.

However, as mentioned in S1201 of FIG. 12, in a case that a drag operation by a user is detected, display of information is controlled not to be turned ON/OFF. Therefore, in a case that a user forwards images by the drag operation when information such as the number of print object 412 is displayed, information such as the number of print object 412 continues to be displayed even if a user touches the information display switching region 1001. For example, in a case that a user searches for the image to be printed by the image-forward with the drag operation, the number of print for the image that a user wants to print is easily set even if the image to be displayed is changed, because the number of print object 412 continues to be displayed.

As mentioned above in S1208 of FIG. 12, in a case that the image is touched by the drag operation after touching, the image-forward is performed, even if the image switching object 411 or 412 is selected by touching of a user. Therefore, for example, the image-forward is performed even if a user performs the drag operation quickly and touches the image switching object by mistake.

Figure 16A:
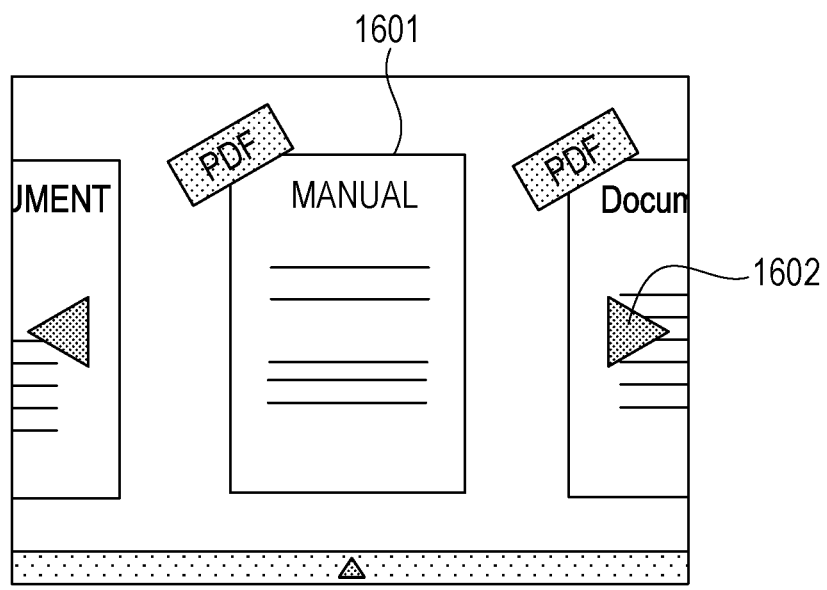
FIGS. 16A and 16B are diagrams showing an image display example displayed on a display portion 201.
Figure 16B:
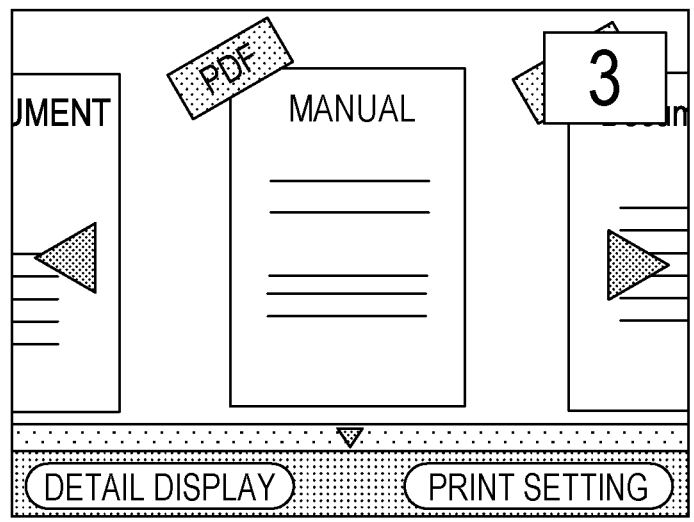
Figure 17A:
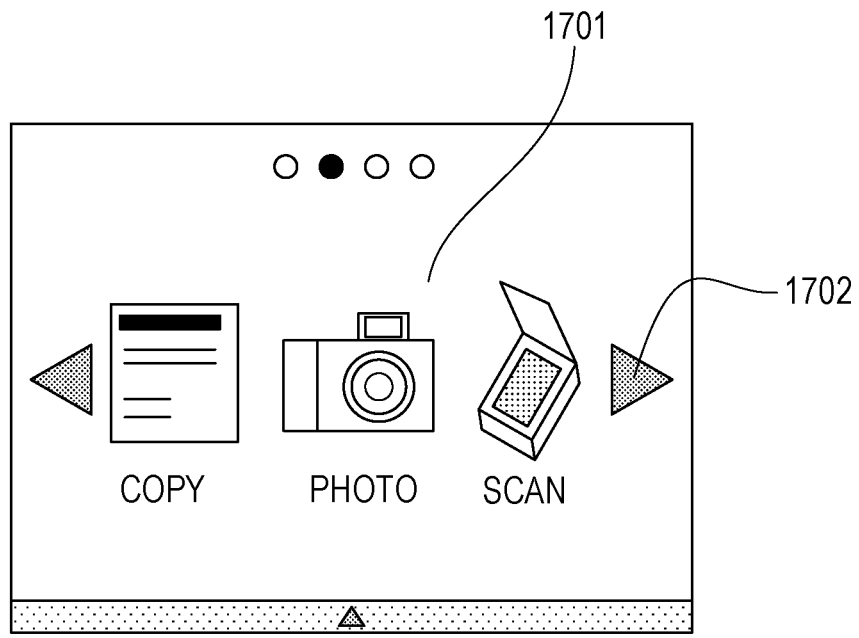
FIGS. 17A and 17B are diagrams showing an image display example displayed on a display portion 201.
Figure 17B:
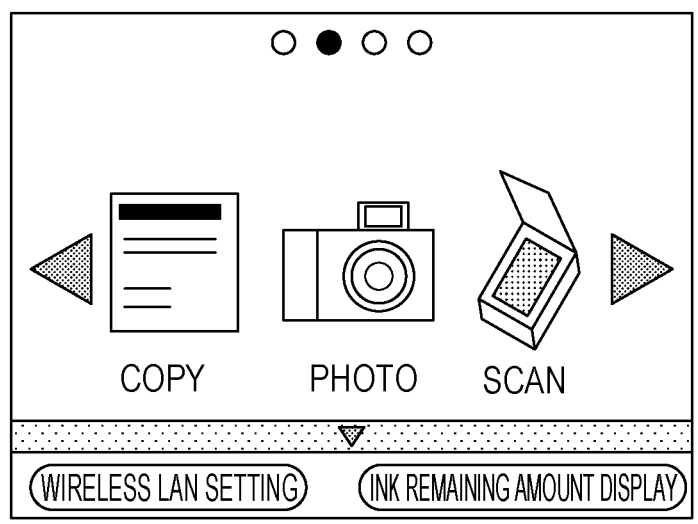

In the present embodiment, the image file is used to be explained as the object to be displayed. However the disclosure is not limited to this embodiment. The disclosure is able to be applied to a various kinds of data. For example, as shown in FIGS. 16A and 16B, the object to be displayed may be a document object, and the document object to be displayed may be switched by touching or the drag operation by a user. And FIGS. 17A and 17B are diagrams showing menu screen to select various kinds of function of the information processing apparatus 101. The object to be displayed which is included in the menu screen may be switched by touching or the drag operation by a user.

In the above embodiment, the drag operation is used to be explained as a moving operation by a user. However, the disclosure is not limited to this embodiment. In the disclosure, a flick operation which means that flick user's finger on the touch panel may be applied.

In the above embodiment, example of a user performing instructions by using the touch panel for deciding the region to be processed in the image. However, the disclosure is not limited to this embodiment. In the disclosure, the case that the object to be displayed is switched by using various kinds of pointing devices such as mouse, track ball, touch pen, and touch pad can be applied.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processing may be executed by one computer (CPU or MPU) or a plurality of computers may cooperate for execution. Not limited to the case of execution by a computer (or a CPU, a MPU or the like) of a program stored in a memory such as a ROM, hardware (circuit or the like) to perform the process described in the above embodiments may perform the process. A part of the process described in the above embodiments may be executed by a computer (or a CPU, a MPU or the like), and the remaining part may be executed by hardware.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
a memory configured to store a program; and
a processor configured to execute the program stored in the memory,
wherein the processor causes a display touch panel to display a first image among a plurality of images, and an image switching object,
wherein in a first case where a moving operation is performed on the first image on the display touch panel, the processor moves the first image with a movement distance corresponding to a distance of the moving operation on the display touch panel,
wherein the processor determines, when the moving operation is being performed in the first case, whether the first image is being touched or another object is being touched on the display touch panel,
wherein in a second case where the image switching object as the another object is touched by the user on the display touch panel when the moving operation is being performed so that it is determined that the another object is being touched in the determination, the processor changes a display target image among the plurality of images from the first image to a second image among the plurality of images, without a release operation from the image switching object, and
wherein, in a third case where it is determined that the first image is being touched in the determination, the processor moves continuingly the first image on the display touch panel.

2. The apparatus according to claim 1,
wherein the processor determines whether the image switching object is being touched, based on a position where the image switching object is arranged on the display touch panel and a touch position on the display touch panel which the user touches.

3. The apparatus according to claim 1,
wherein the processor changes the display target image in the second case, in accordance with a predetermined order of the plurality of images, and
wherein the second image is adjacent to the first image in the predetermined order.

4. The apparatus according to claim 3,
wherein the processor causes the display touch panel to display a part of the first image and a part of the second image, in movement of the first image in the first case.

5. The apparatus according to claim 1,
wherein the processor causes the display touch panel to display the image switching object on the first image.

6. The apparatus according to claim 1,
wherein, in the first case, if the moving distance of the moving operation between a start touch point of the moving operation and an end touch point of the moving operation is longer than a predetermined distance, the processor causes the display touch panel to display the second image and not to display the first image.

7. The apparatus according to claim 1,
wherein the processor detects a start touch point and an end touch point of the moving operation, and detects a halfway touch point where the user touches the display touch panel after the start touch point and before the end touch point in the moving operation, and
wherein, in the first case, if each of a first direction from the start touch point to the halfway touch point and a second direction from the halfway touch point to the end touch point is a predetermined direction, the processor causes the display touch panel to display the second image and not to display the first image, and
if the first direction is the predetermined direction and the second direction is not the predetermined direction, the processor causes the display touch panel to display the first image and not to display the second image.

8. The apparatus according to claim 1,
wherein the moving operation is a flick operation or a drag operation on the display touch panel.

9. The apparatus according to claim 1,
wherein in a case where the image switching object is touched by the user on the display touch panel and the moving operation is not performed while the image switching object is being touched, the processor changes a display target image among the plurality of images from the first image to a third image among the plurality of images, the third image being determined in accordance with a time period in which the image switching object is touched.

10. The apparatus according to claim 9,
wherein if the processor changes the display target image from the first image to the third image and the user performs the moving operation without a release operation from the image switching object, the processor moves the third image in accordance with the moving operation and causes the display touch panel to display an image adjacent to the third image.

11. The apparatus according to claim 1,
wherein in a case where the image switching object is touched by a user on the display touch panel and then the moving operation is performed from the image switching object on the display touch panel, the processor moves the first image with a movement distance corresponding to a distance of the moving operation on the display touch panel.

12. The apparatus according to claim 1, wherein in a fourth case where a touch on the display touch panel in the moving operation in the first case is released, the processor changes the display target image from the first image to the second image.

13. The apparatus according to claim 1,
wherein in a case where the image switching object is touched by the user on the display touch panel and the touch on the image switching object is released when the first image is being displayed, the processor changes a display target image among the plurality of images from the first image to the second image.

14. A method comprising:
causing a display touch panel to display a first image among a plurality of images, and an image switching object;
in a first case where a moving operation is performed on the first image on the display touch panel, moving the first image with a movement distance corresponding to a distance of the moving operation on the display touch panel;
determining, when the moving operation is being performed in the first case, whether the first image is being touched or another object is being touched on the display touch panel;
in a second case where the image switching object as the another object is touched by the user on the display touch panel when the moving operation is being performed so that it is determined that the another object is being touched in the determination, changing a display target image among the plurality of images from the first image to a second image among the plurality of images, without a release operation from the image switching object; and
in a third case where it is determined that the first image is being touched in the determination, moving continuingly the first image on the display touch panel.

15. The method according to claim 14,
wherein a determination is made whether the image switching object is touched, based on a position where the image switching object is arranged on the display touch panel and a touch position on the display touch panel which the user touches.

16. The method according to claim 14,
wherein the display target image is changed in the second case, in accordance with a predetermined order of the plurality of images, and
wherein the second image is adjacent to the first image in the predetermined order.

17. The method according to claim 16, wherein the display touch panel is caused to display a part of the first image and a part of the second image, in movement of the first image in the first case.

18. The method according to claim 14,
wherein the display touch panel is caused to display the image switching object on the first image.

19. The method according to claim 14,
wherein in the first case, if the moving distance of the moving operation between a start touch point of the moving operation and an end touch point of the moving operation is longer than a predetermined distance, the display touch panel is caused to display the second image and not to display the first image.

20. The method according to claim 14,
wherein a start touch point and an end touch point of the moving operation, and a halfway touch point where the user touches the display touch panel after the start touch point and before the end touch point in the moving operation, are detected, and
wherein, in the first case, if each of a first direction from the start touch point to the halfway touch point and a second direction from the halfway touch point to the end touch point is a predetermined direction, the display touch panel is caused to display the second image and not to display the first image, and
if the first direction is the predetermined direction and the second direction is not the predetermined direction, the display touch panel is caused to display the first image and not to display the second image.

21. The method according to claim 14,
wherein the moving operation is a flick operation or a drag operation.

22. The method according to claim 14,
wherein in a case where the image switching object is touched by the user on the display touch panel and the moving operation is not performed while the image switching object is being touched, a display target image among the plurality of images is changed from the first image to a third image among the plurality of images, the third image being determined in accordance with a time period in which the image switching object is touched.

23. The method according to claim 22,
wherein if the display target image is changed from the first image to the third image and the user performs the moving operation without a release operation from the image switching object, the third image is moved and the display touch panel is caused to display an image adjacent to the third image.

24. A non-transitory recording medium storing a program for causing a computer to execute a method comprising:
causing a display touch panel to display a first image among a plurality of images, and an image switching object;
in a first case where a moving operation is performed on the first image on the display touch panel, moving the first image with a movement distance corresponding to a distance of the moving operation on the display touch panel;
determining, when the moving operation is being performed in the first case, whether the first image is being touched or another object is being touched on the display touch panel;
in a second case where the image switching object as the another object is touched by the user on the display touch panel when the moving operation is being performed so that it is determined that the another object is being touched in the determination, changing a display target image among the plurality of images from the first image to a second image among the plurality of images, without a release operation from the image switching object; and
in a third case where it is determined that the first image is being touched in the determination, moving continuingly the first image on the display touch panel.

* * * * *